United States Patent
Matityahu et al.

(10) Patent No.: US 7,898,984 B2
(45) Date of Patent: Mar. 1, 2011

(54) ENHANCED COMMUNICATION NETWORK TAP PORT AGGREGATOR ARRANGEMENT AND METHODS THEREOF

(75) Inventors: Eldad Matityahu, Palo Alto, CA (US); Robert Shaw, Los Gatos, CA (US); Dennis Angelo Ramirez Carpio, San Jose, CA (US); Dong Su Lee, Cupertino, CA (US); Ky Hong Le, San Jose, CA (US)

(73) Assignee: Net Optics, Inc., Santa Clara, CA (US)

( * ) Notice: Subject to any disclaimer, the term of this patent is extended or adjusted under 35 U.S.C. 154(b) by 547 days.

(21) Appl. No.: 11/835,228

(22) Filed: Aug. 7, 2007

(65) Prior Publication Data

US 2009/0041051 A1 Feb. 12, 2009

(51) Int. Cl.
*H04L 12/28* (2006.01)
(52) U.S. Cl. ............................. 370/254; 370/401
(58) Field of Classification Search .............. 370/252, 370/254, 255, 389–392, 400, 401
See application file for complete search history.

(56) References Cited

U.S. PATENT DOCUMENTS

| | | | |
|---|---|---|---|
| 4,802,161 A | 1/1989 | Byars et al. | |
| 5,173,794 A | 12/1992 | Cheung et al. | |
| 5,648,965 A | 7/1997 | Thadani et al. | |
| 5,781,318 A | 7/1998 | Tremblay | |
| 5,825,775 A | 10/1998 | Chin et al. | |
| 5,983,308 A | 11/1999 | Kerstein | |
| 6,041,037 A | 3/2000 | Nishio et al. | |
| 6,108,310 A | 8/2000 | Wilkinson et al. | |
| 6,167,025 A | 12/2000 | Hsing et al. | |
| 6,272,136 B1 * | 8/2001 | Lin et al. | 370/392 |
| 6,366,557 B1 | 4/2002 | Hunter | |
| 6,424,627 B1 * | 7/2002 | Sørhaug | 370/241 |
| 6,449,247 B1 | 9/2002 | Manzardo et al. | |
| 6,658,565 B1 | 12/2003 | Gupta et al. | |
| 6,801,940 B1 | 10/2004 | Moran et al. | |
| 6,823,383 B2 | 11/2004 | MacBride | |
| 6,841,985 B1 | 1/2005 | Fetzer | |
| 6,882,654 B1 | 4/2005 | Nelson | |

(Continued)

FOREIGN PATENT DOCUMENTS

JP 2001-197066 A 7/2001

(Continued)

OTHER PUBLICATIONS

"Non Final Office Action", U.S. Appl. No. 11/174,033, Mailing Date: May 29, 2008.

(Continued)

*Primary Examiner*—Hong Cho
(74) *Attorney, Agent, or Firm*—IP Strategy Group, P.C.

(57) ABSTRACT

An arrangement in a network device for facilitating at least one of multiple connection speeds with a network, active response between a monitoring device and an end-device, and power over Ethernet (POE) over a network is provided. As a facilitator of multiple connection speeds, the arrangement includes a plurality of physical layer interface (PHY) and media access controller (MAC) that are configured to support multiple speeds. As a facilitator of active response, the arrangement includes a logic arrangement for multicasting a set of instructions that is sent from a monitoring port. As a facilitator of POE, the arrangement is configured to receive data traffic (e.g., data packets and/or power packets) through a first network port and to send the data traffic out a second network port.

19 Claims, 4 Drawing Sheets

U.S. PATENT DOCUMENTS

| | | | |
|---|---|---|---|
| 6,898,630 | B2 | 5/2005 | Ueno et al. |
| 7,027,437 | B1 | 4/2006 | Merchant et al. |
| 7,171,504 | B2 | 1/2007 | Ishii |
| 7,277,957 | B2 | 10/2007 | Rowley et al. |
| 7,308,705 | B2 | 12/2007 | Gordy et al. |
| 7,321,565 | B2 | 1/2008 | Todd et al. |
| 7,324,553 | B1 | 1/2008 | Varier et al. |
| 7,415,013 | B1 | 8/2008 | Lo |
| 7,477,611 | B2 * | 1/2009 | Huff .......................... 370/252 |
| 7,486,625 | B2 | 2/2009 | Matityahu et al. |
| 7,505,416 | B2 | 3/2009 | Gordy et al. |
| 7,573,896 | B2 * | 8/2009 | Wang et al. ................. 370/419 |
| 7,616,587 | B1 * | 11/2009 | Lo et al. ..................... 370/254 |
| 7,760,859 | B2 | 7/2010 | Matityahu et al. |
| 2001/0040870 | A1 | 11/2001 | Ohmori et al. |
| 2002/0003592 | A1 | 1/2002 | Hett et al. |
| 2002/0026374 | A1 | 2/2002 | Moneymaker et al. |
| 2002/0073199 | A1 | 6/2002 | Levine et al. |
| 2002/0087710 | A1 | 7/2002 | Aiken et al. |
| 2002/0110148 | A1 * | 8/2002 | Hickman et al. ............ 370/475 |
| 2002/0176355 | A1 | 11/2002 | Mimms et al. |
| 2002/0180592 | A1 | 12/2002 | Gromov |
| 2003/0112760 | A1 | 6/2003 | Puppa et al. |
| 2003/0142666 | A1 | 7/2003 | Bonney et al. |
| 2003/0147385 | A1 * | 8/2003 | Montalvo et al. ........... 370/389 |
| 2004/0023651 | A1 | 2/2004 | Gollnick et al. |
| 2004/0109411 | A1 | 6/2004 | Martin |
| 2004/0120259 | A1 | 6/2004 | Jones et al. |
| 2004/0190547 | A1 | 9/2004 | Gordy et al. |
| 2004/0202164 | A1 * | 10/2004 | Hooper et al. .............. 370/390 |
| 2004/0215832 | A1 | 10/2004 | Gordy et al. |
| 2005/0005031 | A1 | 1/2005 | Gordy et al. |
| 2005/0060535 | A1 | 3/2005 | Bartas |
| 2005/0129033 | A1 | 6/2005 | Gordy et al. |
| 2005/0132051 | A1 | 6/2005 | Hill et al. |
| 2005/0213512 | A1 * | 9/2005 | Konuma et al. ............. 370/252 |
| 2005/0257262 | A1 | 11/2005 | Matityahu et al. |
| 2006/0083268 | A1 | 4/2006 | Holaday et al. |
| 2006/0083511 | A1 | 4/2006 | Edmunds et al. |
| 2006/0153092 | A1 | 7/2006 | Matityahu et al. |
| 2006/0200711 | A1 | 9/2006 | Schondelmayer et al. |
| 2006/0233115 | A1 | 10/2006 | Matityahu et al. |
| 2007/0002754 | A1 | 1/2007 | Matityahu et al. |
| 2007/0002769 | A1 | 1/2007 | Matityahu et al. |
| 2007/0064917 | A1 | 3/2007 | Matityahu et al. |
| 2007/0081553 | A1 | 4/2007 | Cicchetti et al. |
| 2007/0171966 | A1 | 7/2007 | Light et al. |
| 2008/0214108 | A1 | 9/2008 | Beigne et al. |
| 2009/0040932 | A1 | 2/2009 | Matityahu et al. |
| 2009/0041051 | A1 | 2/2009 | Matityahu et al. |
| 2009/0168659 | A1 | 7/2009 | Matityahu et al. |
| 2010/0146113 | A1 | 6/2010 | Matityahu et al. |

FOREIGN PATENT DOCUMENTS

| | | |
|---|---|---|
| JP | 2006148686 A | 6/2006 |
| KR | 10-2004-0058415 A | 7/2004 |

OTHER PUBLICATIONS

"Final Office Action", U.S. Appl. No. 11/174,033, Mailing Date: Dec. 10, 2008.
"Belkin Quick Installation Guide", N1 Vision Wireless Router, Belkin International, Inc., no date, 3 pages total.
"Network Status Display", Belkin International, Inc., 2007, 1 page total.
"International Search Report", Issued in PCT Application No. PCT/US2008/072484; Mailing Date: Feb. 13, 2009.
"Written Opinion", Issued in PCT Application No. PCT/US2008/072484; Mailing Date: Feb. 13, 2009.
"International Preliminary Report on Patentability", Issued in PCT Application No. PCT/US2006/25436; Mailing Date: May 22, 2008.
"U.S. Appl. No. 11/965,668", filed Dec. 27, 2007.
"Written Opinion", Issued in PCT Application No. PCT/US2008/072493; Mailing Date: Feb. 13, 2009.
"Non Final Office Action", U.S. Appl. No. 11/370,487, Mailing Date: Mar. 25, 2009.
"Non Final Office Action", U.S. Appl. No. 11/835,233, Mailing Date: Jun. 9, 2009.
HP, et al., "Reduced Gigabit Media Independent Interface (RGMII)", Nov. 30, 2005, http://web.archive.org/web/20051113015000/http://www.hp.com/rnd/pdfs/RGMIIv2_0_final_hp.pdf.
Wikipedia, "Field-programmable Gate Array"; Jan. 21, 2005, http://web.archive.org/web/20050121193052/http://en.wi kiped ia.org/wiki/Field-programmable_gate_array.
Xilinx, "LogiCore OPB Ethernet Lite Media Access Controller", v1.01b, Mar. 3, 2006.
"Non Final Office Action", U.S. Appl. No. 11/370,487, Mailing Date: Jun. 11, 2009.
"Non Final Office Action", U.S. Appl. No. 11/174,033, Mailing Date: Sep. 15, 2009.
"Fast Ethernet Fiber-to-Fiber Converters", Canary Communications, Inc. 7 pages total, 2004.
"Sequence reducer/ Sequence Mirror Operator's Guide", Peribit Networks, Inc, 13 pages total, 2001-2005.
"PeriScope Central Management System (CMS) 5.0 Administrator's Guide", Peribit Networks, Inc, 13 pages total. 2003-2004.
"VSS Coppertap Literature PA", VSS Monitoring Inc, 2 pages. 2003-2004.
"VSS Easy Install Guide PA", VSS Monitoring Inc. 8 pages total. 2003-2005.
"VSS Linksafe PA", VSS Monitoring Inc., 1 page. 2003-2005.
"International Preliminary Report on Patentability", Issued in PCT Application No. PCT/US2008/0724184; Mailing Date: Feb. 18, 2010.
"International Preliminary Report on Patentability", Issued in PCT Application No. PCT/US2008/072493; Mailing Date: Feb. 18, 2010.
"Non Final Office Action", U.S. Appl. No. 11/174,032, Mailing Date: Apr. 23, 2008.
"Final Office Action", U.S. Appl. No. 11/835,233, Mailing Date: Oct. 30, 2009.
"Notice of Allowance and Fee(s) Due", U.S. Appl. No. 11/965,668, Mailing Date: Oct. 8, 2009.
HP, "Reduced Gigabit Media Independent Interface (RGMII)", http://web.archive.org/web/20051113015000/http://www.hp.com/md/pdfs/RGMIIv2_0_final_hp. Pdf, Palo Alto, CA, Apr. 1, 2002, 9 pages.
Wikipedia, "Field-programmable Gate Array", http://web.archive.org/web/20050121193052/http://en.wi kiped ia.org/wiki/Field-programmable_gate_array, Jan. 21, 2005, 3 pages.
Xilinx, "LogiCore OPB Ethernet Lite Media Access Controller", v1.01b, Santa Clara, CA, Mar. 3, 2006, 23 pages.
"100Base-TX/100BBase-FX Media Converters E-10OBTX-FX-04 User's Guide", Transitions Networks, Minneapolis, MN, Copyright 1998-2000, 4 pages.
"Replacement Statement and Explanation under 37CFR 1.915 in Support of Request for Inter Partes Reexamination of US Patent 7,486,625", Sonnenschein Nath & Rosenthal LLP, Jan. 22, 2010, 251 pages.
"Request for Inter Partes Reexamination of US Patent 7,486,625", Sonnenschein Nath & Rosenthal LLP, Dec. 18, 2009, 69 pages.
"Inter Partes Reexamination Office Action", U.S. Appl. No. 95/001,318, Patent in Re-examination: 7,486,825, Mailing Date: Apr. 23, 2010.
"Non Final Office Action", U.S. Appl. No. 11/835,233, Mailing Date: Jun. 25, 2010.
"Application as Filed", U.S. Appl. No. 12/839,373, filed Jul. 19, 2010.
"Final Office Action", Issued in U.S. Appl. No. 11/174,033; Mailing Date: Jun. 24, 2010.

* cited by examiner

ENHANCED COMMUNICATION NETWORK TAP PORT AGGREGATOR ARRANGEMENT AND METHODS THEREOF

CROSS REFERENCE TO RELATED APPLICATIONS

The present invention is related to the following applications, all of which are incorporated herein by reference:

Commonly assigned application entitled "Intelligent Communications Network Tap Port Aggregator," filed on Mar. 7, 2006 herewith by Matityahu et al., application Ser. No. 11/370,487, issued as a U.S. patent, U.S. Pat. No. 7,760,859, on Jul. 20, 2010; and Commonly assigned application entitled "Active Response Communications Network Tap," filed on Jul. 1, 2005 herewith by Matityahu et al., application Ser. No. 11/174,033.

BACKGROUND OF THE INVENTION

Telecommunication networks have long been employed to facilitate communication between users who are geographically dispersed. Communication may include transmission of data packets, such as media and voice packets, between a plurality of network devices, such as routers and switches. In today society, a company may depend upon its network to be fully functionally in order to conduct business. Thus, a company may monitor its network in order to ensure reliable performance, enable fault detection, and detect unauthorized activities.

Monitoring may be performed by connecting network taps to the networks to gather information about the data traffic in order to share the information with monitoring tools. However, conventional network taps may employ a store-and-forward technique that may cause delay in the network traffic, thereby creating communication latency. In addition, since data traffic may flow into a port of a network device in a bidirectional manner, full-duplex monitoring may require a second network interface card (NIC). Besides increasing the cost of monitoring, a second NIC may cause the configuration of the monitoring system to become more complex and less flexible.

BRIEF SUMMARY OF THE INVENTION

The invention relates, in an embodiment, to an arrangement in a network device for facilitating multiple connection speeds with a network. The arrangement includes a set of network ports. The set of network ports includes a set of input network ports for receiving data traffic and a set of output network ports for outputting the data traffic from the network device. The arrangement also includes a monitoring port, which is configured to receive aggregated data traffic from the set of network ports. The aggregated data traffic is aggregated by an aggregator. The arrangement further includes a plurality of physical layer interface (PHY). Each PHY of the plurality of PHY is configured to support multiple speeds. The arrangement yet also includes a media access controller (MAC), which is configured to support the multiple speeds, whereas the data traffic is configured to traverse the network device between the set of input network ports and the set of output network ports irrespective whether power is provided to circuitry of the network device.

The invention also relates, in an embodiment, to an arrangement in a network device for facilitating active response between a monitoring device and an end-device. The arrangement includes a set of network ports, which includes a set of input network ports for receiving data traffic and a set of output network ports for outputting the data traffic from the network device. The arrangement also includes a monitoring port, which is configured to transmit a set of instructions from the monitoring device coupled to the monitoring port. The arrangement further includes logic arrangement for receiving and multicasting the set of instructions, whereas the data traffic is configured to traverse the network device between the set of input network ports and the set of output network ports irrespective whether power is provided to circuitry of the network device.

The invention yet also relates, in an embodiment, to an arrangement in a network device for facilitating power over Ethernet (POE) over a network. The arrangement includes a first network port, which is configured to receive a signal that includes data packets and power packets. The arrangement also includes a second network port, which is configured to receive the signal from the first network port. The arrangement further includes a tap structure, which is configured to couple to the first network port and the second network port to receive the data packets, whereas data traffic is configured to traverse the network device between the set of input network ports and the set of output network ports irrespective whether power is provided to circuitry of the network device.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As aforementioned, a company's network is an important asset to the company. The network needs to be working properly in order for the company to conduct business. The company may monitor the network in order to ensure reliability and security of the network. Unlike more conventional network tapping methods, which may cause delay in the network traffic, the network device with port aggregation is able to provide full-duplex monitoring with zero delay. In addition, since the network device with port aggregation is capable of aggregating stream of data traffic, full-duplex monitoring may occur without incurring the additional cost of a second network interface card (NIC).

Figure 1:
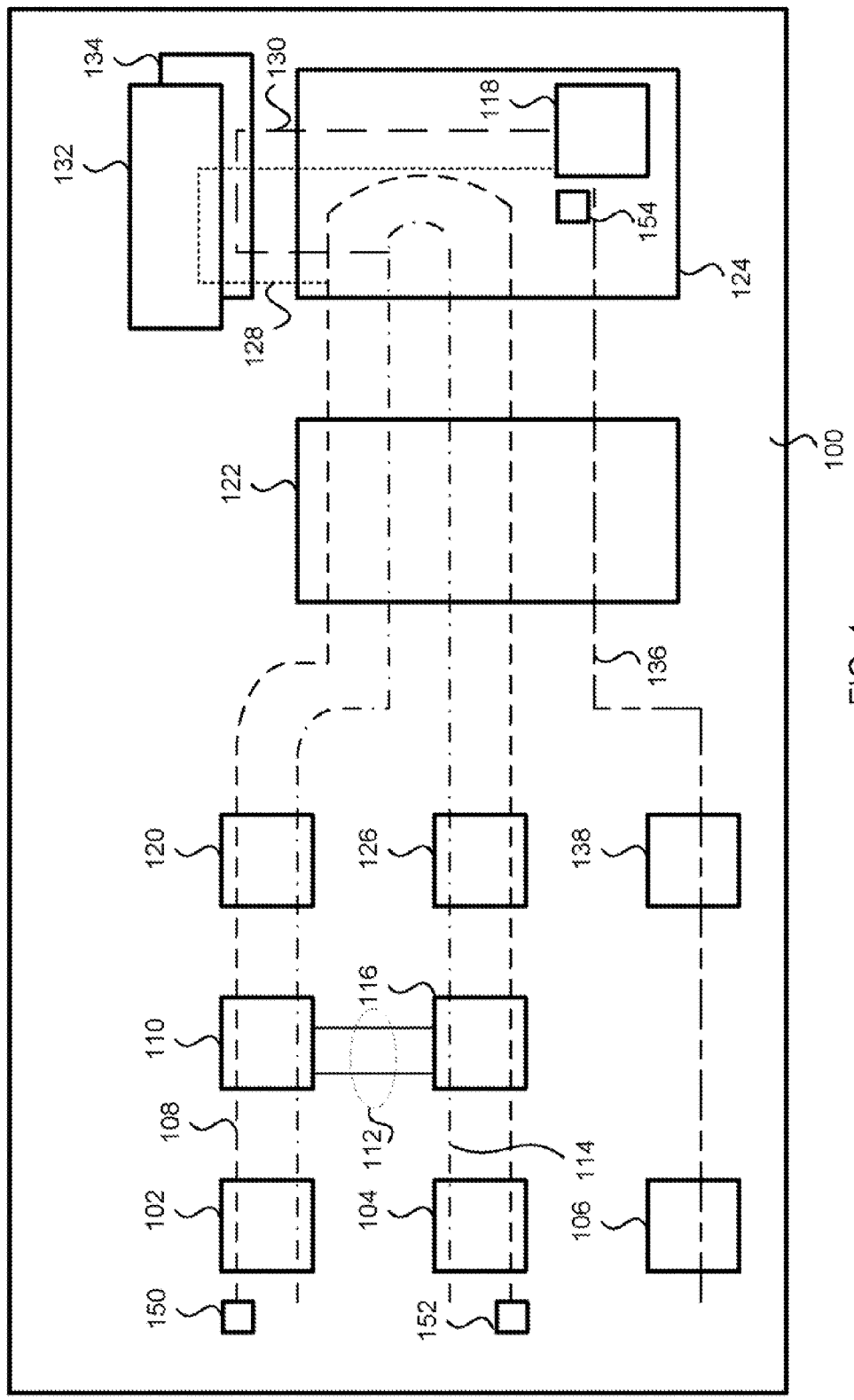
FIG. 1 shows a simple block diagram of a port aggregator.

To facilitate discussion, prior art FIG. 1 shows a simple block diagram of a port aggregator. A port aggregator 100 may include a set of network ports (102 and 104) for transmitting and receiving data traffic and a monitor port 106. Consider the situation wherein, for example, a stream of data packets 150 is being received by port aggregator 100. In an example, stream of data packets 150 may be received by a first network port 102. Stream of data packets 150 may flow from first network port 102 through a network line 108 to a switch 110. Switch 110 may be a mechanical switch that may be employed to create a bypass route 112 to a second network port 104 when the power to power aggregator 100 is off. Similarly, second network port 104 may also receive a second incoming stream of data packets 152 and may route stream of data packets 152 along a network line 114 through a switch 116 to first network port 102 via bypass route 112.

As can be appreciated from the foregoing, power aggregator 100 is a discrete network tap. In other words, power aggregator 100 enables data traffic to continue to flow between network devices irrespective whether power is available to enable the circuitry of power aggregator 100 (as shown by the bypass route 112). Thus, data traffic is not disrupted even if power is not available to enable power aggregator 100 to perform its monitoring function.

If power is on for port aggregator 100, then the set of switches (110 and 116) may route the incoming data traffic through an FPGA (field-programmable gate array) 124. In the example above, stream of data packets 150 has been received by switch 110. Since power is on, switch 110 may transport stream of data packets 150 to a PHY (physical layer interface) 120. As discussed herein, a PHY refers to an integrated circuit that may be employed to interface with a media access controller (MAC). Upon receiving the data traffic, PHY 120 may send stream of data packets 150 to a MAC 122. Stream of data packets 150 may be received by MAC 122 and sent along to FPGA 124.

At FPGA 124, for data traffic flowing from first network port 102, FPGA 124 may create a loop to enable stream of data packets 150 to continue flowing to second network port 104. Similarly, stream of data packets 152 coming from second network port 104 may flow along network line 114 through switch 116 to a PHY 126 and MAC 122 to FPGA 124. Upon receiving stream of data packets 152, FPGA 124 may create a loop and send stream of data packets 152 downstream to first network port 102.

To monitor the streams of data packets that may be received by the network ports, an aggregator component 118 may be employed to tap network lines 108 and 114, as the paths flow through FPGA 124. In other words, streams of data packets (150 and 152) from the network ports (102 and 104) may be aggregated by aggregator component 118 from within FPGA 124 to be sent onward to a monitor device, which may be associated with monitor port 106. A copy of the streams of data packets (150 and 152) may be forwarded to aggregator component 118 along a monitor path 128, for stream of data packets 150, and a monitor path 130, for stream of data packets 152.

To facilitate network traffic management, a memory buffer may be associated with each monitor path. In an example, streams of data packets (150 and 152) flowing through monitor paths 128 and 130 may be temporarily store in memory buffers 132 and 134, respectively. Streams of data packets (150 and 152) may flow from the memory buffers to FPGA 124. FPGA 124 may employ an arbitration algorithm to determine the order in which the streams of data packets (150 and 152) may be processed. In an example, a round-robin method may be employed in which streams of data packets (150 and 152) from memory buffers 132 and 134 may be alternately handled. If streams of data packets (150 and 152) are received at the same time, data traffic from one memory buffer may be given higher priority. In an example, FPGA may be configured to give higher priority to stream of data packets 150 coming from memory buffer 132.

Once streams of data packets are received by aggregator component 118, aggregator component 118 may aggregate streams of data packets (150 and 152) into a single aggregate stream of data packets 154 and forward the aggregate data traffic along a line 136 through MAC 122 and a PHY 138 to monitor port 106.

If the streams of data packets (150 and 152) are coming in at a faster rate than the memory buffers can handle, such that the memory buffers become full, then the streams of data packets (150 and 152) may be directed away from the monitoring paths. In an example, if memory buffer 132 is full, then any additional data packets coming in from network line 108 may be dropped from monitoring path 128 until memory buffer 132 has cleared out sufficient memory space to handle additional data packets. Note that the data packets that are being dropped are only being dropped from the monitoring paths (128 and 130) and not from the network lines (108 and 114). In other words, the original data packets are still being transported between the two network ports but the original data packets are not being copied and forwarded to the monitoring device along the monitor paths (128 and 130) when memory buffer overflow occurs. Also, data packets may only be dropped from a monitor path if the memory buffer associated with that monitor path is full. In an example, if memory buffer 132 is full but memory buffer 134 is not, then only data traffic that may be intended for memory buffer 132 may be dropped.

To expand the capability of the port aggregator, additional features may be provided.

In accordance with embodiments of the present invention, an enhanced communication network tap (ECNT) port aggregator is provided. Embodiments of the invention include expanding the port aggregator to accommodate different Ethernet speeds. Embodiments of the invention also include adding an active response functionality to the port aggregator in order to allow a monitoring device the capability of communicating back into the network by full-duplex communication. Embodiments of the invention further include implementing power over Ethernet (POE) in order to send power through the internet. Embodiments of the invention yet also including a dropped packet counter for identifying packets dropped during monitoring.

In this document, various implementations may be discussed using routers as an example. This invention, however, is not limited to routers and may include other network devices such as switches and hubs. Instead, the discussions are meant as examples and the invention is not limited by the examples presented.

In an embodiment of the invention, an ECNT port aggregator may provide support for multiple Ethernet speeds as a single unit. To enable this functionality, the ECNT port aggregator may include electrical components, such as PHYs and a MAC, that are capable of supporting multiple speeds. In an example, a PHY may include logic for determining the best speed that an ECNT port aggregator may utilize. The logic may employ an auto-negotiation algorithm for determining the best speed based on the speed of the end-device. The logic may also employ a force mode method for determining the best speed. The force mode method may be based on a user's configuration preference.

In another embodiment of the invention, an ECNT port aggregator may include active response functionality. With active response, control packets, such as a TCP reset, may be sent back into the network to handle network conditions, such as anomalies. Thus, with active response, the monitoring capability may be expanded to enable a user, such as an IT administrator, to respond to adverse network conditions.

In yet another embodiment of the invention, an ECNT port aggregator may also enhanced monitoring capability by employing a dropped packet counter. By implementing a dropped packet counter, statistical information about dropped packets due to memory buffer overflow may be collected and made available for later analysis.

In yet another embodiment of the invention, an ECNT port aggregator may also support POE. With POE, power may be distributed to network end-devices that may require electricity to function without incurring the additional cost associated with providing the power to the end-devices. Also, with POE, the ECNT port aggregator may be able to support incoming signals that may require POE functionality to reach the destination end-device.

The features and advantages of the present invention may be better understood with reference to the figures and discussions that follow.

Figure 2:
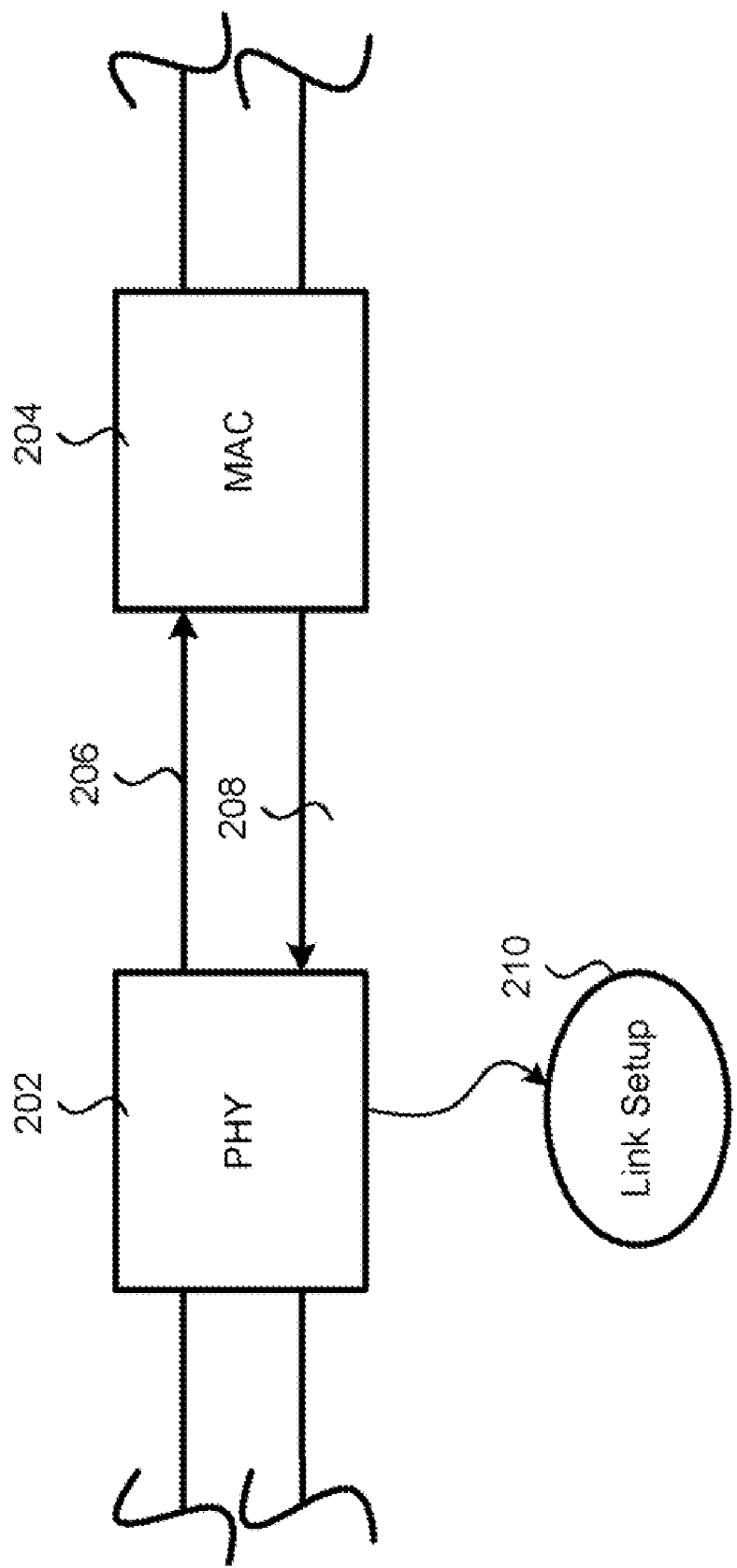
FIG. 2 shows, in an embodiment of the invention, a simple block diagram illustrating a multiple speeds PHY (physical interface layer) and MAC (media access controller).

Those skilled in the arts are aware that network communication may be conducted at different speeds, such as 10 megabits per second (mbps), 100 mbps, and 1000 mbps. To enable the ECNT port aggregator to support multiple speeds, the PHY and the MAC components that may be utilized may be able to support multiple speeds. FIG. 2 shows, in an embodiment of the invention, a simple block diagram illustrating a multiple speeds PHY and MAC.

To enable a port aggregator to support multiple speeds, a multiple speeds PHY 202 may be employed. Multiple speeds PHY 202 may be a commercially available PHY, such as Marvel PHY 88B1111. In order for PHY 202 to perform link setup 210, an algorithm may be employed. In an example, link setup 210 may be implemented by employing auto negotiation. With auto negation, PHY 202 may be able to determine the best speed for optimal performance. In an example, if PHY 202 is capable of supporting 10 mbps, 100 mbps, and 1000 mbps, then 1000 mbps is the best speed. However, 1000 mbps may not be applicable if the end-devices at both network ports are incapable of supporting this speed. Instead, the speed limitation may be based on the lower speed device. In an example, if one end-device is capable of supporting 1000 mbps and the other end-device is only capable of supporting 100 mbps, PHY 202 may be configured to operate at 100 mbps.

Instead of employing auto negotiation, PHY 202 may employ a force mode to determine the best speed rate. With the force mode, PHY 202 may be forced to operate at a specific speed, regardless of the speed an end-device may be capable of supporting. In an example, PHY 202 may be forced to operate at 100 mbps even though both end-devices may be capable of supporting 1000 mbps.

In an embodiment, a MAC 204, which is connected to PHY 202 via lines 206 and 208, may also be capable of supporting multiple speeds. Similar to PHY 202, different link setup may be employed by MAC 204 to support multiple speeds. In an example, force mode may be employed to force MAC 204 to operate at a specific speed.

As can be appreciated from the foregoing, with PHYs and a MAC that is capable of supporting multiple speeds, the ECNT port aggregator may be configured to support end devices of different speeds. With the multiple speed enhancements, performance may be improved since the speed of operation that an ECNT port aggregator may be able to support may be adjusted to accommodate for the different end-devices.

Figure 3:
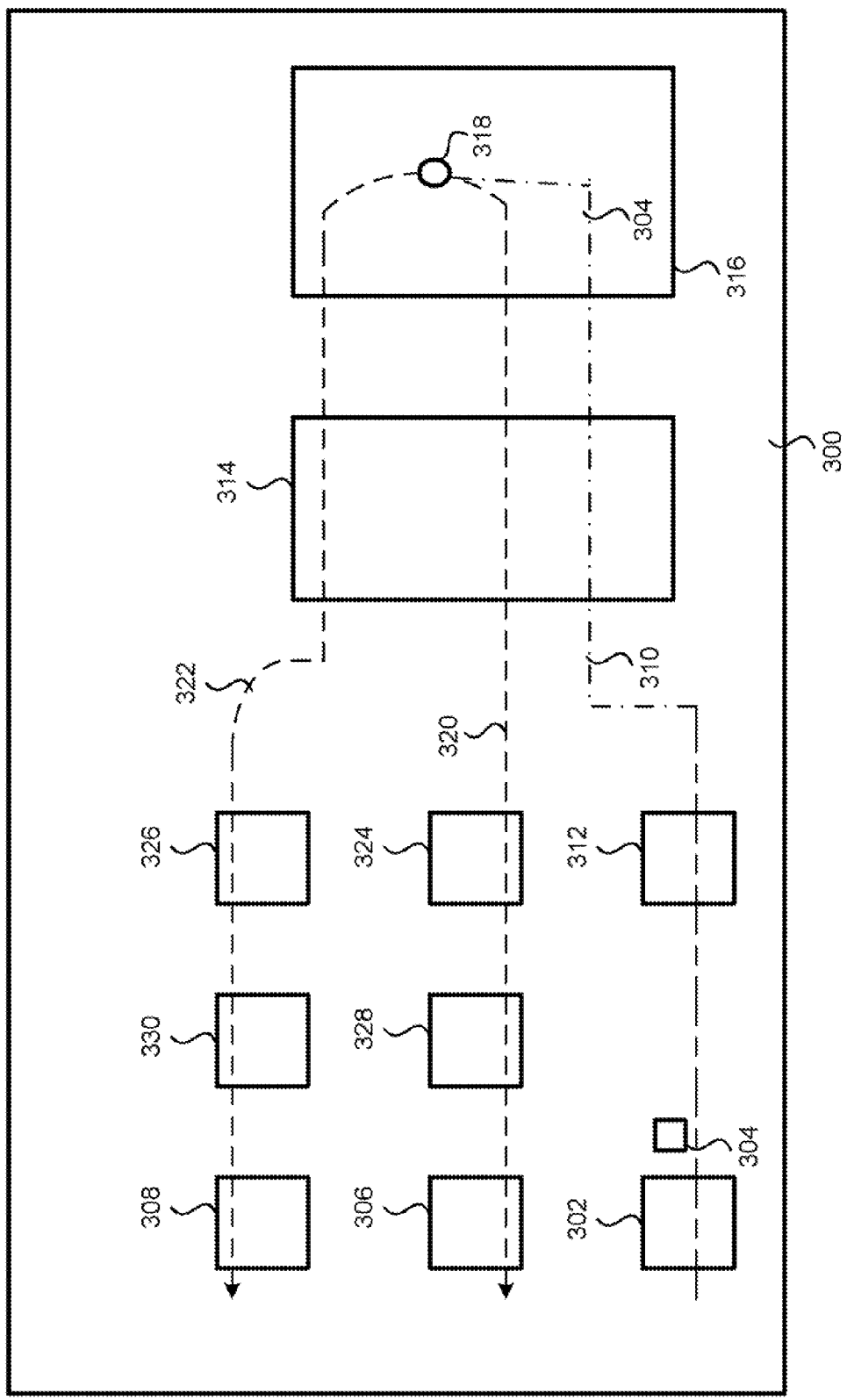
FIG. 3 shows, in an embodiment invention, a simple block diagram illustrating a port aggregator with active response functionality.

FIG. 3 shows, in an embodiment invention, a simple block diagram illustrating a port aggregator 300 with active response functionality. As aforementioned, active response may be employed to enable the monitoring device connected to the monitor port of the port aggregator to communicate back into the network.

Consider the situation wherein, for example, a monitor device attached to a monitor port 302 may want to send a set of instructions via a stream of control packets 304 to network ports 306 and 308. As can be appreciated from the foregoing, the type of control packets that may be sent back into the network may depend upon the capability and purpose of the monitor device. In an example, the monitor device at monitor port 302 may send a TCP reset. Stream of control packets 304 may flow from monitor port 302 along a monitor path 310 to a PHY 312. Upon receiving stream of control packets 304, PHY 312 may forward stream of control packets to a programmable component, such as a FPGA 316, via a MAC 314.

In an embodiment, FPGA 316 may include a bridge 318 that may be configured to receive incoming stream of control packets 304 and to multicast stream of control packets 304 back out to the end-devices at network ports 306 and 308. Without bridge 318, the port aggregator may not be able to transmit control packets coming from the monitor device. As can be appreciated from the foregoing, by modifying the port aggregator to include bridge 318, the enhanced communication network tap port aggregator may now provide a path by which a monitor device may interact with the network ports in order to actively respond to network conditions. In an example, a user may be able to send a TCP reset when the user identifies an anomaly in the network traffic.

In an embodiment, FPGA 316 may be configured to multicast the incoming control packets to all network ports. In an example, stream of control packets may be intended for end-device located at network port 306. Regardless of the intended final destination. FPGA 316 may be configured to multicast the stream of data packets to both network ports (306 and 308). Since the ECNT port aggregator provides a non-intrusive method for monitoring a network, the stream of data traffic may not be altered. Thus, FPGA 316 may multicast the incoming control packets out to all network ports and let the end-devices handled the control packet accordingly. In other words, stream of control packets may be sent along a network line 320 through a MAC 314, a PHY 324, and a switch 328 before being received by the end-device at monitor port 306. Similarly, the same stream of control packets may be sent along a network line 322 through MAC 314, a PHY 326, and a switch 330 before arriving at port 308. Since the control packet is intended for the end device at port 306, upon receiving the control packet, the end device at port 306 may process the control packet whereas the end device at port 308 may ignore the control packet.

As can be appreciated from the foregoing, the ECNT port aggregator with active response may enable the user through the monitor port to send control packets back into the network. Thus, the user is able to actively respond to network situations that may adversely impact the network. As a result, the ECNT port aggregator may provide the user with an additional tool for monitoring and managing the network.

Figure 4:
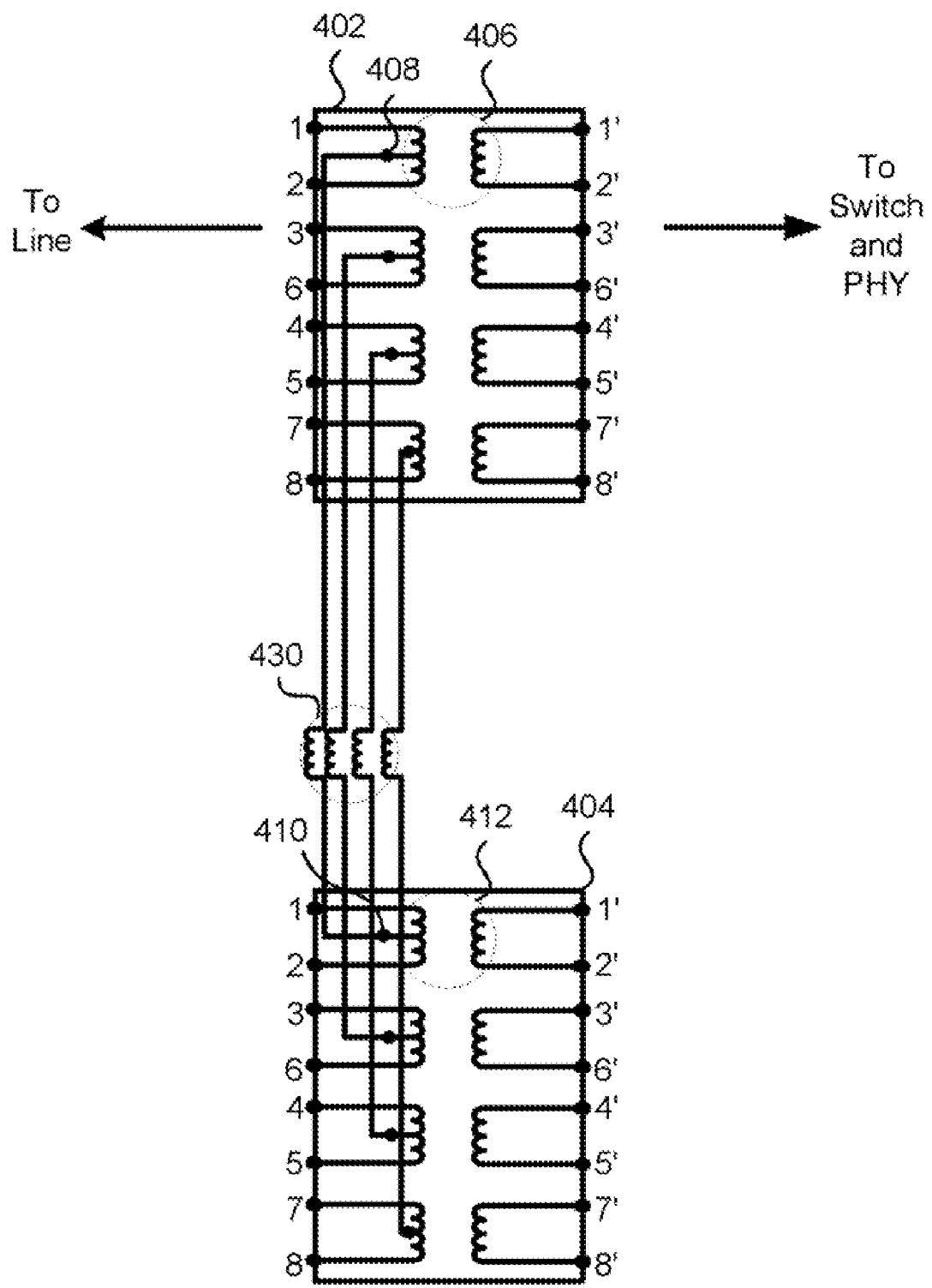
FIG. 4 shows, in an embodiment of the invention, a simple schematic of a port aggregator with power over Ethernet (POE).

FIG. 4 shows, in an embodiment of the invention, a simple schematic of a port aggregator with power over Ethernet (POE). As discussed herein, POE refers to a system for transmitting power and data via an Ethernet network device to end-devices that may require power. In an example, IP (internet protocol) telephones may benefit from POE since IP telephones may receive and/or transmit data packets but may not always have access to an electrical outlet.

To provide power to remote devices, an ECNT port aggregator with POE functionality may be provided. An ECNT port aggregator may include a network port 402 and a network port 404. Consider the situation wherein, for example, an Ethernet line is connected to network port 402. A signal including data packets and power may be transfer from Ethernet line though network port 402 to network port 404. In an example, a first set of connector pins (pins 1-2, pins 3-6, pins 4-5, pins 7-8) from network port 402 may receive the signal from the Ethernet line.

To extract the data packets from the signal received from the Ethernet line, transformers may be employed to perform coupling between the first set of connector pins and a second set of connector pins (pins 1'-2', pins 3'-6', pins 4'-5', pins 7'-8'). In an example, a transformer 406 may perform coupling between pins 1-2 and pins 1'-2'. In the example of FIG. 4, the coupling is performed using magnetics. Note that magnetic coupling enable data packets to be transmitted from network port 402 to network port 404 via a set of switches, a set of PHY, a MAC and an FPGA as described in FIG. 1 discussed above.

To transfer the power received by network port 402 to network 404, center taps may be employed to create bridges between the transformers. In an example, a center tap 408 may be connected to transformer 406 of pins 1-2 of network port 402 to transfer power to a center tap 410, which is connected to a transformer 412 of pins 1-2 of network port 404 to create a POE bypass route to transfer power between network port 402 and network port 404. To facilitate the transfer of power, an inductor 430 may be utilized to make a connection between the two center taps (408 and 410). Inductor 430 may also be employed to perform low-pass filter in order to remove high-pass signals, thereby enabling only power to be transfer through the POE bypass route.

As can be appreciated from the forgoing, one or more embodiments of the present invention provide for an enhanced communication network tap (ECNT) power aggregator. With embodiments of the present invention, 1) devices of different Ethernet speeds may now be supported by a single unit, 2) power may sent on the same signal as a data packet in order to enable electrical devices to be operational without being actually plugged into an electrical outlet, 3) monitoring capability may be enhanced by accessing statistical data collected by a dropped packet counter, and 4) active response functionality to enable monitoring device the capability of communicating back into the network by full-duplex communication. With these additional features, the ECNT power aggregator increases efficiency while minimizing network costs.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An arrangement in a network device for facilitating multiple connection speeds with a network, the arrangement comprising:
    a set of network ports, said set of network ports including a set of input network ports for receiving data traffic and a set of output network ports for outputting said data traffic from said network device, said set of input network ports and said set of output network ports including a first network port and a second network port, said first network port being configured to receive a signal, said signal including data packets and power packets, said second network port being configured to received said signal from said first network port;
    a tap structure, said tap structure being configured to couple to said first network port and said second network port to receive said data packets, whereas data traffic is configured to traverse said network device between said set of input network ports and said set of output network ports irrespective whether power is provided to circuitry of said network device, wherein a first center tap, connected to a first transformer that is associated with said first network port, is coupled to a second center tap, connected to second transformer that is associated with said second network port, to create a bridge between said first transformer and said second transformer, said bridge being a bypass route to transfer said power packets between said first network port and said second network port;
    a monitoring port, said monitoring port being configured to receive aggregated data traffic from said set of network ports, said aggregated data traffic being aggregated by an aggregator;
    a plurality of physical layer interface (PHY), each PHY of said plurality of PHY being configured to support said multiple connection speeds, wherein a first PHY of said plurality of PHY is configured to include a first logic for performing link setup, said link setup including determining the best speed said network device is capable of supporting; and a media access controller (MAC), said MAC being configured to support said multiple connection speeds, whereas said data traffic is configured to traverse said network device between said set of input network ports and said set of output network ports irrespective whether power is provided to circuitry of said network device.

2. The arrangement of claim 1 wherein said first logic of said first PHY includes performing auto-negotiation to perform said link setup based on the speed of an end -device connected to one of said set of network ports.

3. The arrangement of claim 1 wherein said logic of said first PHY includes performing force mode to perform said link setup, said force mode being determined based on a user's configuration preference.

4. The arrangement of claim 1 wherein said MAC is configured to include a second logic for performing link setup, said link setup including determining the best speed said network device is capable of supporting.

5. The arrangement of claim 4 wherein said second logic of said MAC includes performing auto-negotiation to perform said link setup based on the speed of an end-device connected to one of said set of network ports.

6. The arrangement of claim 4 wherein said second logic of said MAC includes performing force mode to perform said link setup, said force mode being determined based on a user's configuration preference.

7. An arrangement in a network device for facilitating active response between a monitoring device and an end-device, the arrangement comprising:

a set of network ports, said set of network ports including a set of input network ports for receiving data traffic and a set of output network ports for outputting said data traffic from said network device, said set of input network ports and said set of output network ports including a first network port and a second network port, said first network port being configured to receive a signal, said signal including data packets and power packets, said second network port being configured to received said signal from said first network port;

a tap structure, said tap structure being configured to couple to said first network port and said second network port to receive said data packets, whereas data traffic is configured to traverse said network device between said set of input network ports and said set of output network ports irrespective whether power is provided to circuitry of said network device, wherein a first center tap, connected to a first transformer that is associated with said first network port, is coupled to a second center tap, connected to second transformer that is associated with said second network port, to create a bridge between said first transformer and said second transformer, said bridge being a bypass route to transfer said power packets between said first network port and said second network port;

a monitoring port, said monitoring port being configured to transmit a set of instructions from said monitoring device coupled to said monitoring port; and logic arrangement for receiving and multicasting said set of instructions, whereas said data traffic is configured to traverse said network device between said set of input network ports and said set of output network ports irrespective whether power is provided to circuitry of said network device.

8. The arrangement of 7 wherein said logic arrangement is a field-programmable gate array (FPGA).

9. The arrangement of 8 wherein said FPGA is configured to include a bridge, said bridge being configured to receive said set of instructions.

10. The arrangement of 9 wherein said bridge is configured to multicast said set of instructions to a plurality of end devices coupled to said set of network ports.

11. The arrangement of claim 7 wherein said set of instructions is embodied within a set of control packets.

12. The arrangement of claim 7 wherein said set of instructions includes a Transmission Control Protocol (TCP) reset.

13. An arrangement in a network device for facilitating power over Ethernet (POE) over a network, the arrangement comprising:

a first network port, said first network port being configured to receive a signal, said signal including data packets and power packets;

a second network port, said second network port being configured to received said signal from said first network port; and a tap structure, said tap structure being configured to couple to said first network port and said second network port to receive said data packets, whereas data traffic is configured to traverse said network device between said set of input network ports and said set of output network ports irrespective whether power is provided to circuitry of said network device, wherein a first center tap, connected to a first transformer that is associated with said first network port, is coupled to a second center tap connected to second transformer that is associated with said second network port, to create a bridge between said first transformer and said second transformer, said bridge being a bypass route to transfer said power packets between said first network port and said second network port.

14. The arrangement of claim 13 wherein said first network port is configured to include a first set of connector pins, said first set of connector pins is configured to receive said signal.

15. The arrangement of claim 14 wherein said second network is configured to include a second set of connector pins, said second set of connector pins is configured to receive said power packets.

16. The arrangement of claim 15 wherein said first transformer is associated with said first set of connector pins, said second transformer is associated with said second set of connector pins, and said first transformer is coupled to said second transformer to enable coupling between said first set of connector pins and said second set of connector pins.

17. The arrangement of claim 16 wherein said coupling is facilitated by a set of magnetics.

18. The arrangement of claim 16 wherein an inductor is positioned between said first center tap and said second center tap to perform low-pass filter on said signal, said low-pass filter including removing non-power packets from said signal.

19. The arrangement of claim 16 wherein said inductor is configured to create a connection between said first center tap and said second center tap.

* * * * *